(12) United States Patent
Qi et al.

(10) Patent No.: US 9,905,983 B2
(45) Date of Patent: Feb. 27, 2018

(54) BRUSH FOR AN ELECTRIC MOTOR

(71) Applicant: Johnson Electric S.A., Murten (CH)

(72) Inventors: Fa Yun Qi, Shenzhen (CN); Shu Dan Zhao, Shenzhen (CN); Cheng Shun Du, Shenzhen (CN); Rui Feng Qin, Hong Kong (CN)

(73) Assignee: Johnson Electric S.A., Murten (CH)

( * ) Notice: Subject to any disclaimer, the term of this patent is extended or adjusted under 35 U.S.C. 154(b) by 239 days.

(21) Appl. No.: 14/976,624

(22) Filed: Dec. 21, 2015

(65) Prior Publication Data

US 2016/0190757 A1 Jun. 30, 2016

(30) Foreign Application Priority Data

Dec. 31, 2014 (CN) .......................... 2014 1 0854724

(51) Int. Cl.
*H02K 13/00* (2006.01)
*H01R 39/26* (2006.01)

(52) U.S. Cl.
CPC ........... *H01R 39/26* (2013.01); *H02K 13/006* (2013.01)

(58) Field of Classification Search
CPC ...... H02K 13/10; H02K 13/006; H02K 13/00; H02K 13/003; H01R 39/26
USPC ................................................ 310/229–253
See application file for complete search history.

(56) References Cited

U.S. PATENT DOCUMENTS

| | | | | |
|---|---|---|---|---|
| 2,739,255 A * | 3/1956 | Shobert, II | ............. | H01R 39/24 310/228 |
| 6,603,235 B1 * | 8/2003 | Kimura | ................ | H01R 39/383 310/239 |
| 2007/0035196 A1* | 2/2007 | Sidgwick | ............... | H01R 39/24 310/249 |
| 2009/0033172 A1* | 2/2009 | Igawa | .................... | H01R 39/26 310/248 |
| 2009/0152978 A1* | 6/2009 | Fournier | ................ | H01R 39/18 310/248 |
| 2010/0225198 A1* | 9/2010 | Lau | ......................... | H01R 39/26 310/248 |

* cited by examiner

*Primary Examiner* — Thanh Lam
(74) *Attorney, Agent, or Firm* — Muncy, Geissler, Olds & Lowe, P.C.

(57) ABSTRACT

A brush for an electric motor has a brush body having a front end surface configured to make sliding electrical contact with a commutator of the motor. First and second side surfaces are connected to the front end surface. The first side surface and the second side surface are positioned on opposite sides of the brush body in a rotational direction of the commutator. The front end surface has a first contact surface and a second contact surface that contact the commutator earlier than other regions of the front end surface, and are respectively positioned on diametrically opposed corners of the front end surface. In an initial state, the width of the contact area between the brush and the commutator is increased to extend the commutation time.

20 Claims, 7 Drawing Sheets

BRUSH FOR AN ELECTRIC MOTOR

CROSS REFERENCE TO RELATED APPLICATIONS

This non-provisional patent application claims priority under 35 U.S.C. § 119(a) from Patent Application No. 201410854724.2 filed in The People's Republic of China on Dec. 31, 2014, the entire contents of which are hereby incorporated by reference.

FIELD OF THE INVENTION

This invention relates to electric motors and in particular, to a brush for an electric motor.

BACKGROUND OF THE INVENTION

A brush DC (direct current) motor adopts an electric brush (herein referred to as a brush) to cooperate with a commutator to realize continuous conduction and current commutation of a power supply circuit of the motor. A front end surface of the conventional brush is a planar surface when in an initial state. However, the commutator is cylindrical, and a contact between a newly assembled brush and the commutator is generally a line contact, which is unstable. As a result, an irregular vibration of the brush is generated during rotation of the commutator, thus producing mechanical noise and sparks. In addition, during rotation of the commutator, when adjacent commutator segments are short circuited by one brush, the current of the motor fluctuates significantly and thus forms a ripple current. In the prior art, measuring a rotational speed of the motor rotor using the ripple current has been developed, which reduces the cost of a speed sensor by eliminating the magnetic sensor and the magnet ring. However, the unstable contact between the brush and the commutator increases or magnifies the irregularity of the ripple current, which leads to inaccurate readings or a complete failure of measuring the rotational speed by using the ripple current. This is particularly relevant to gear motor assemblies, also known as motor actuators or actuators, due to their need for accurate position determination in many applications.

SUMMARY OF THE INVENTION

Hence there is a desire for a brush for use in electric motors and gear motor assemblies which can address the above problems.

Accordingly, in one aspect thereof, the present invention provides a brush for an electric motor, comprising: a brush body comprising: a front end surface configured to make sliding electrical contact with a commutator of the motor, the front end surface comprising a first contact surface and a second contact surface, the first contact surface and the second contact surface contacting the commutator earlier than other regions of the front end surface, and being respectively positioned at diametrically opposed corner portions of the front end surface; and a first side surface and a second side surface connected to the front end surface, the first side surface and the second side surface being positioned on opposite sides of the brush body in a rotational direction of the commutator.

Preferably, the front end surface comprises a first protruding portion and a second protruding portion, the first contact surface is positioned on the first protruding portion, the second contact surface is positioned on the second protruding portion, and the first protruding portion and the second protruding portion cooperatively form a V shaped configuration.

Preferably, the brush body is prismatic having a longitudinal axis parallel to the first and second side surfaces, and an inclination angle of the first protruding portion relative to a cross section which is perpendicular to the longitudinal axis of the brush body, is greater than an inclination angle of the first contact surface relative to the cross section.

Preferably, the first protruding portion and the second protruding portion are respectively positioned on opposite sides of a first diagonal line of the front end surface, and the first contact surface and the second contact surface are positioned at opposite ends of a second diagonal line of the front end surface.

Preferably, a protruding height of the first protruding portion and a protruding height of the second protruding portion gradually increase in a direction away from the first diagonal line, and gradients of the protruding height of the first protruding portion and the second protruding portion relative to the first diagonal line are substantially the same.

Preferably, the first protruding portion and the second protruding portion are positioned on opposite sides of a center line of the front end surface, the center line is disposed mid-way between and parallel to the first and second side surfaces.

Preferably, the first contact surface and the second contact surface each contact the commutator along a contact line, a ratio of a length of the contact line to an axial height of the brush is between 20% and 90%. More favorably, the ratio is between 40% and 80%. In some embodiments, the contact line has a length which is substantially half of the axial height of the brush.

Alternatively, wherein a protruding height of the first protruding portion and a protruding height of the second protruding portion gradually increase in a direction away from the center line, and gradients of the protruding height of the first protruding portion and the second protruding portion relative to the center line are substantially the same.

Preferably, the first contact surface and the second contact surface have a prismatic shape, a frustum of pyramid shape or a wedge shape.

Preferably, the first contact surface and the second contact surface are symmetrical about a central point of the front end surface.

Preferably, cross sections of the first contact surface and the second contact surface have areas gradually decreasing in the protruding directions of the first contact surface and the second contact surface, respectively.

Preferably, the front end surface forms a first flat surface at a region adjacent to the first contact surface and the first side surface, the front end surface forms a second flat surface at a region adjacent to the second contact surface and the second side surface, the first flat surface intersects or is coplanar with the second flat surface.

According to a second aspect, the present invention provides an electric motor comprising: a stator, including brush gear having brushes; and a rotor rotatably assembled to the stator, the rotor comprising a shaft, a commutator and a rotor core fixed to the shaft, and rotor windings wound around the rotor core and electrically connected to segments of the commutator; wherein each brush is a brush as described above.

According to a further aspect, the present invention provides a gear motor assembly, comprising: a motor; a gearbox assembled to the motor; and a gear train accommodated by the gearbox and driven by the motor; wherein the motor is a motor as defined above.

Preferably, the gear train includes a worm provided on the shaft of the motor and a worm wheel disposed in the gearbox and engaged with the worm.

In comparison with the prior art, in an initial state, the width of the contact area between the brush and the commutator is increased, which extends the commutation time and hence improves regularity of the current commutation and improves the stability of the operation of the motor.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
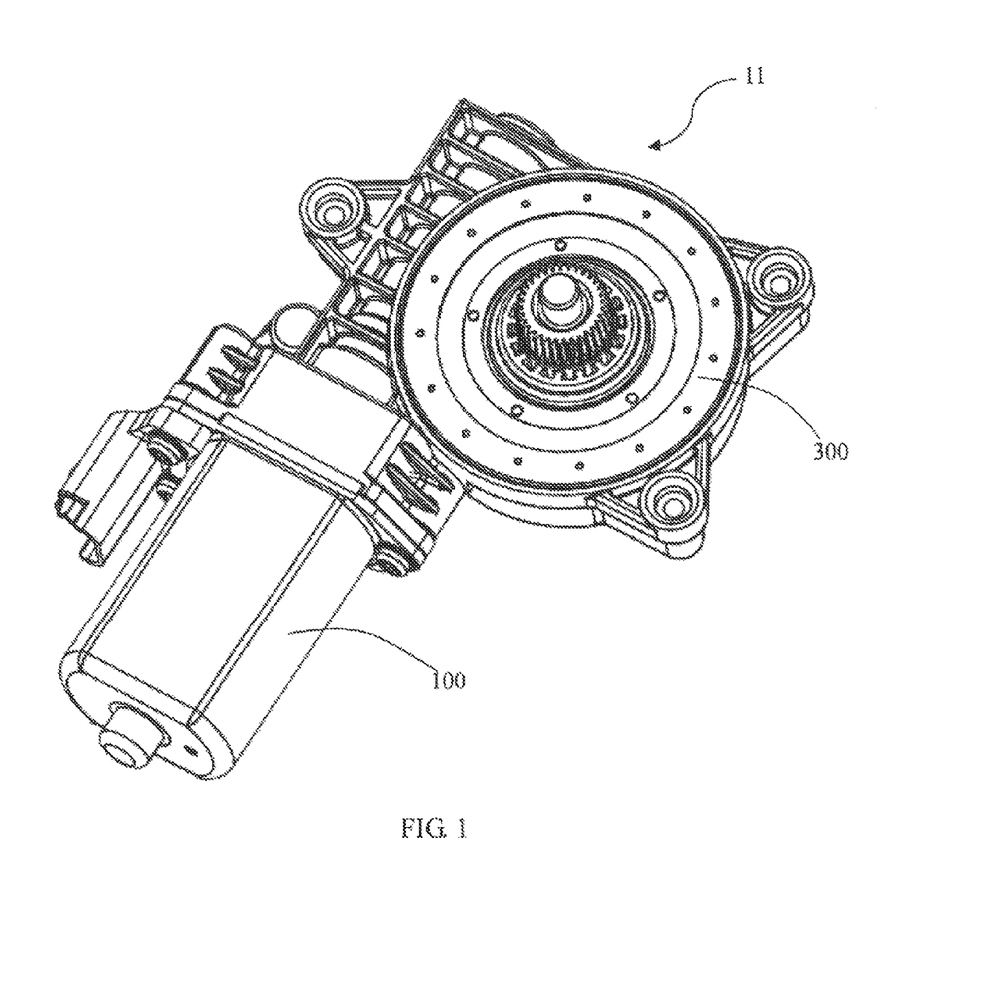
FIG. 1 illustrates a gear motor assembly, including a motor and a gearbox, according to a first embodiment of the invention.
Figure 2:
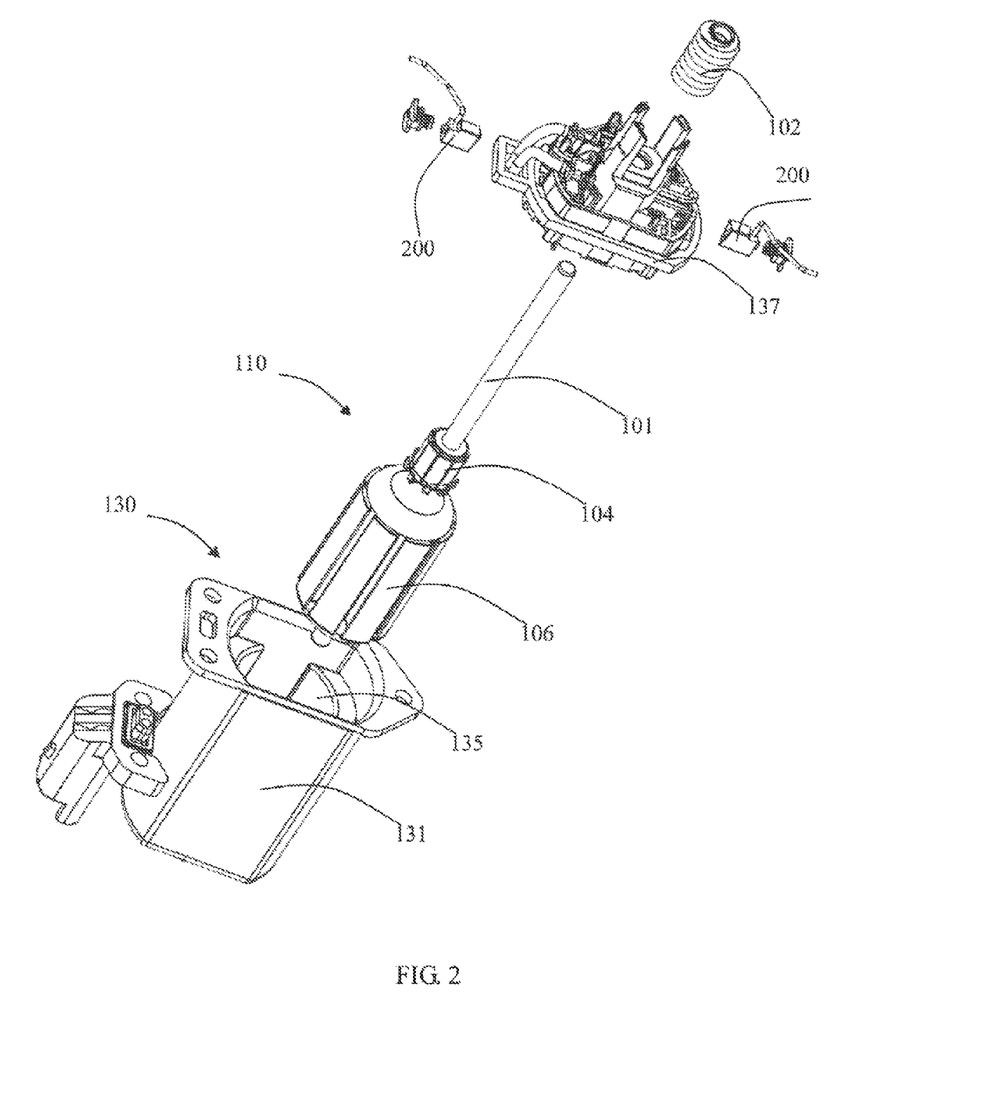
FIG. 2 is an exploded view of the motor of FIG. 1.
Figure 3:
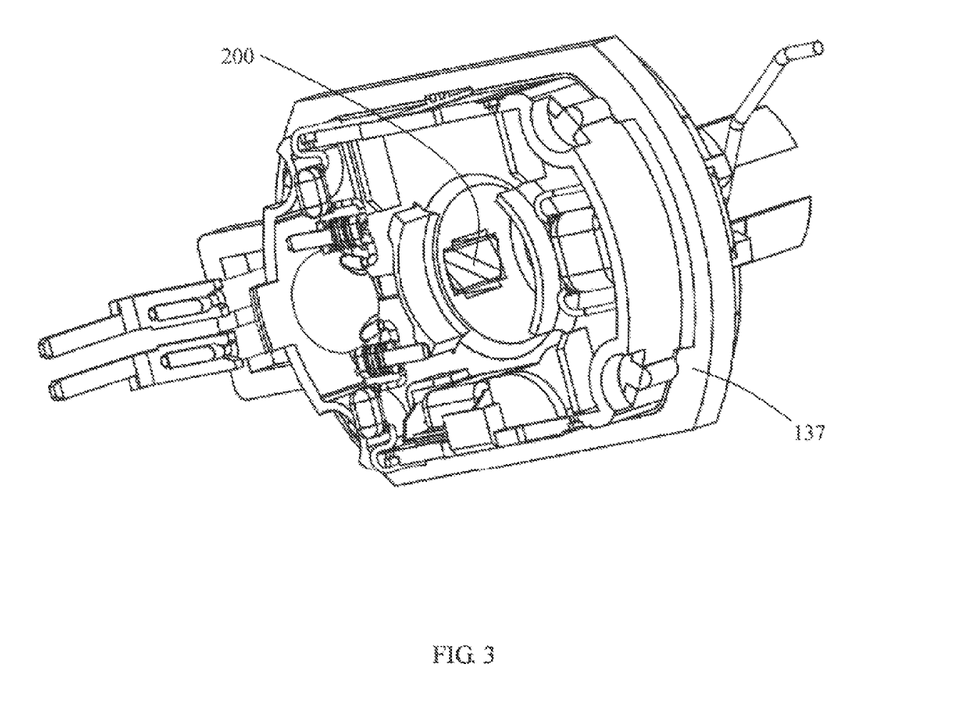
FIG. 3 is an enlarged view of an end cap being a part of the motor of FIG. 2.

FIG. 1 through FIG. 3 show a gear motor assembly 11 according to a first embodiment of the present invention and having a motor 100 and a gearbox 300. The gearbox accommodates a gear train connecting the shaft of the motor to an output of the gearbox. Preferably the gear train is or has a worm gear. The gearbox 300 is assembled to the motor 100, and an output end of a shaft 101 of the motor 100 is provided with a worm 102. The worm gear is accommodated within the gearbox 300, and is engaged with the worm 102.

The motor 100 includes a stator 130 and a rotor 110 rotatably mounted to the stator 130. The rotor 110 includes the shaft 101, a commutator 104, a rotor core 106 and rotor windings (not shown). The commutator 104 and the rotor core 106 are fixed to the shaft 101. The rotor windings are wound around the rotor core 106 and are electrically connected to segments of the commutator 104. The stator 130 includes a generally cylindrical housing 131, a plurality of permanent magnets 135 assembled to an inner surface of the housing 131, and an end cap 137 assembled to an open end of the housing 131. In this embodiment, the end cap 137 is provided with brush gear including two brushes 200. Each brush 200 is slidably disposed in a respective passageway in the end cap 137 extending in a radial direction of the motor shaft 101. The brush 200 is configured to make sliding electrical contact with the segments of the commutator 104 under the urgings of a brush spring (not shown), to supply power to the rotor windings.

Figure 4:
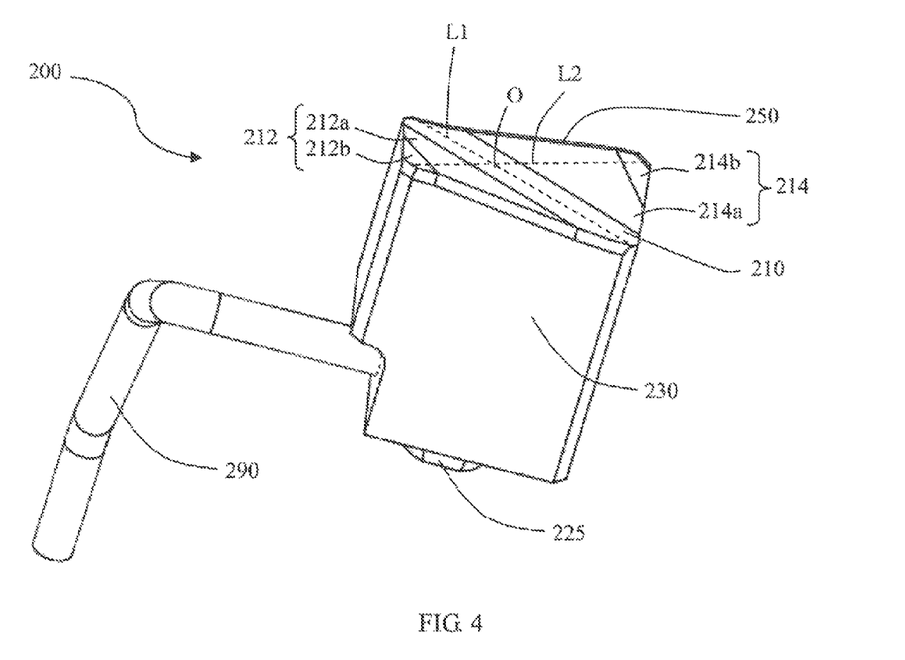
FIG. 4 illustrates a brush employed in the end cap of FIG. 3.
Figure 5:
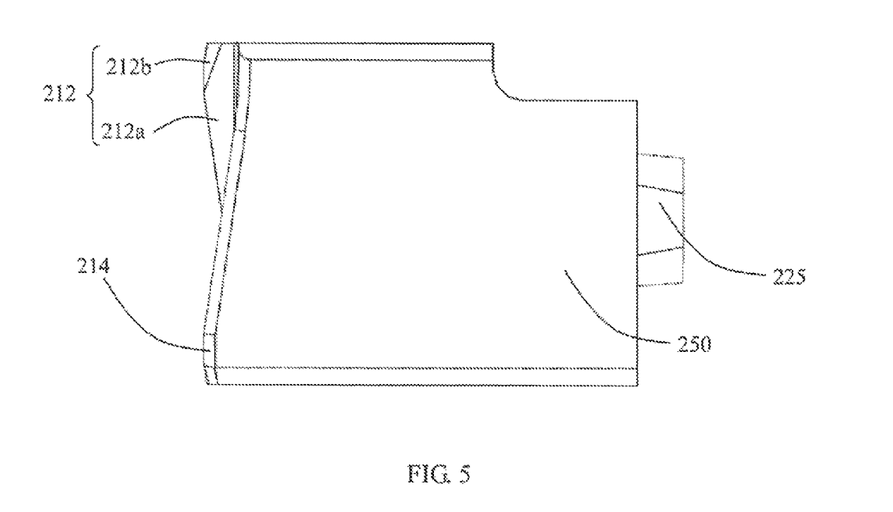
FIG. 5 is a side view of the brush of FIG. 4.

FIGS. 4 and 5, show, on an enlarged scale, one brush 200, according to the first embodiment. The brush 200 includes the brush body and a shunt wire 290 electrically connected to the brush body. The brush body has a substantially prismatic shape, and includes a front end surface 210 configured to slidably contact the commutator segments, and a first side surface 230 and a second side surface 250 connected to the front end surface 210. The first side surface 230 and the second side surface 250 are positioned on opposite sides of the commutator in the rotational direction thereof. One of the first side surface 230 and second side surface 250 is located upstream of the commutator in the rotational direction of the commutator, and the other of the first side surface 230 and second side surface 250 is located downstream of the commutator in the rotational direction of the commutator. The other end surface (rear end surface, for short) opposite to the front end surface 210 forms a protruding mounting portion 225 for mounting a spring. The spring provides a force to press the brush 200 against the commutator 104. The shunt wire 290 is connected to the brush 200 at a position adjacent to the rear end surface. The connection position of the shunt wire 290 is positioned on a top side surface between the first side surface 230 and the second side surface 250 and adjacent the rear end surface.

The front end surface 210 includes a first contact surface 212b and a second contact surface 214b. The first contact surface 212b is positioned on a first protruding portion 212, and the second contact surface 214b is positioned on a second protruding portion 214. The first contact surface 212b and the second contact surface 214b contact the commutator 1104 prior to other regions of the front end surface 210. The first protruding portion 212 and second protruding portion 214 are connected to the first side surface 230 and the second side surface 250, respectively. Preferably, the first protruding portion 212 protrudes the most at a corner position intersecting with the first side surface 230, and the second protruding portion 214 protrudes the most at a corner position intersecting with the second side surface 250, such that portions of the front end surface 210 of the brush 200 adjacent to the first side surface 230 and the second side surface 250 can contact the commutator 104 first. Therefore, the contact between the brush 200 and the commutator 104 is stable, thus reducing vibration of the brush 200. Ideally, the two corner positions are diametrically opposite corners. In addition, in an initial state, the brush 200 substantially contacts the commutator 104 with a greatest width (a distance between the first side surface 230 and the second side surface 250), which extends a commutation time and hence improves regularity of the current commutation and the ripple current.

In this embodiment, the first protruding portion 212 and the second protruding portion 214 are positioned on opposite sides of a first diagonal line L1 of the front end surface 210. Viewed along a direction of the first diagonal line L1, the first protruding portion 212 and the second protruding portion 214 form a V shaped configuration. The first protruding portion 212 includes a first surface 212a adjacent to the first diagonal line L1, and a first contact surface 212b remote from the first diagonal line L1. The first contact surface 212b has an area less than that of the first surface 212a. Preferably, the first surface 212a is an inclined surface, and extends from the first diagonal line L1 toward the first side surface 230 and the commutator 104. The first contact surface 212b is positioned on a vertex corner of the front end surface 210 remote from the first diagonal line L1. Preferably, the first contact surface 212b is an inclined surface, and extends from the first surface 212a toward the first side surface 230 and the commutator 104. An inclination angle of the first contact surface 212b relative to a cross section perpendicular to the first side surface 230 or the second side surface 250 is less than an inclination angle of the first surface 212a relative to this cross section, so as to reduce the noise of the motor 100.

Similarly, the second protruding portion 214 includes a second surface 214a adjacent to the first diagonal line L1, and a second contact surface 214b remote from the first diagonal line L1. The second contact surface 214b has an area less than that of the second surface 214a. Preferably, the second surface 214a is an inclined surface, and extends from the first diagonal line L1 toward the second side surface 250 and the commutator 104. The second contact surface 214b is positioned on a vertex corner of the front end surface 210 remote from the first diagonal line L1. Preferably, the second contact surface 214b is an inclined surface, and extends from the second surface 214a toward the second side surface 250 and the commutator 104. An inclination angle of the second contact surface 214b relative to a cross section perpendicular to the first side surface 230 or the second side surface 250 is less than an inclination angle of the second surface 214a relative to this cross section, so as to reduce the noise of the motor 100.

The first contact surface 212b of the first protruding portion 212 and the second contact surface 214b of the second protruding portion 214 are staggered in an axial direction of the commutator 104 (see FIG. 2), i.e. a line connecting the first protruding portion 212 and the second protruding portion 214 intersects with a rotational plane of the commutator 104, and the first protruding portion 212 and the second protruding portion 214 are positioned on opposite sides of a center line of the first end surface 210 in a rotational direction of the commutator 104. Preferably, the first contact surface 212b and the second contact surface 214b are positioned on opposite ends of a second diagonal line L2 of the front end surface 210. The first protruding portion 212 has the same shape as the second protruding portion 214, such that the contact area between the first protruding portion 212 and the commutator segment can be as equal as possible to the contact area between the second protruding portion 214 and the commutator segment, thus making the ripple current more stable. In this embodiment, cross sections of the first protruding portion 212 and the second protruding portion 214 which are perpendicular to the first side surface and the top side surface have a shape of a triangle or an approximate triangle, and the cross section has an area gradually decreasing in a direction toward the commutator 104. The first protruding portion 212 and the second protruding portion 214 have a shape of a triangular pyramid or a triangular pyramid frustum. Portions of the first protruding portion 212 and the second protruding portion 214 nearest to the commutator 104 are respectively located at distal ends of the second diagonal line L2, i.e. respectively positioned on the first contact surface 212b and the second contact surface 214b. The first protruding portion 212 and the second protruding portion 214 form slopes inclined from opposite corners toward the first diagonal line L1, respectively, thereby forming an inward recess at the position of the first diagonal line L1.

The first side surface 230 is parallel to the second side surface 250, the first protruding portion 212 and the second protruding portion 214 are symmetrical about a central point of the first end surface 210, and the first contact surface 212a and the second contact surface 214b are symmetrical about the central point of the first end surface 210. A protruding height of the first protruding portion 212 and a protruding height of the second protruding portion 214 increase in a direction away from the first diagonal line L1. Preferably, gradients of the protruding height of the first protruding portion 212 and the second protruding portion 214 relative to the first diagonal line L1 are the same. Thus, when the brush 200 is worn, it can be ensured that a contact area between the first protruding portion 212 and the commutator 104 is as equal as possible to a contact area between the second protruding portion 214 and the commutator 104.

Figure 6:
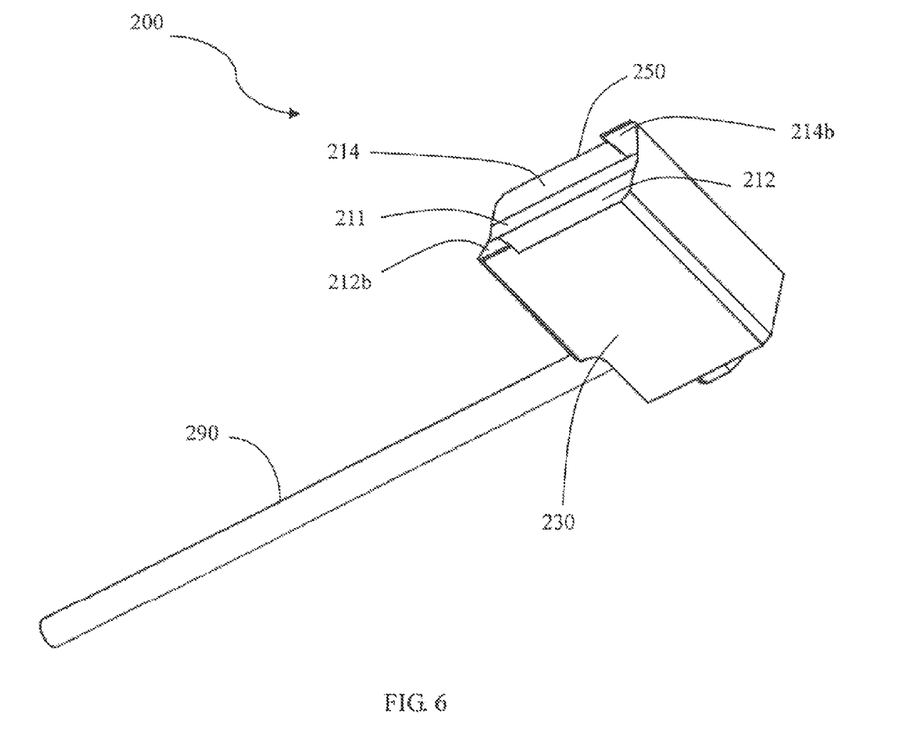
FIG. 6 illustrates a brush according to a second embodiment of the invention.
Figure 7:
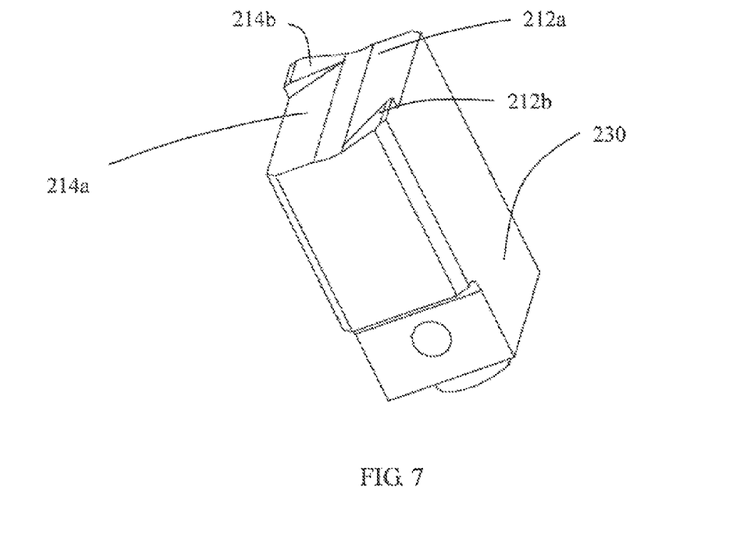
FIG. 7 illustrates the brush of FIG. 6, viewed from another aspect.

Referring to FIG. 6 and FIG. 7, the difference between the brush 200 provided by a second embodiment and the brush provided by the first embodiment is that, the first protruding portion 212 and the second protruding portion 214 are respectively positioned on opposite sides of a center line 211 of the front end surface 210, and, viewed along the center line 211, the first protruding portion 212 and the second protruding portion 214 cooperatively form a V shaped configuration. The center line 211 is substantially parallel to an axial direction of the commutator 104, and is located at a middle of the front end surface 210 in a circumferential direction of the commutator 104. An inclination angle of the first contact surface 212b of the first protruding portion 212 relative to a cross section which is perpendicular to the first side surface 230 or the second side surface 250 is greater than an inclination angle of the first surface 212a relative to this cross section.

In this embodiment, the first contact surface 212b of the first protruding portion 212 and the second contact surface 214b of the second protruding portion 214 are likewise staggered in the axial direction of the commutator 104. Preferably, the first contact surface 212b of the first protruding portion 212 and the second contact surface 214b of the second protruding portion 214 are respectively positioned on opposite corners of the front end surface 210 of the brush 200. When the brush 200 contacts the commutator 104, the contact surface 212b of the first protruding portion 212 and the contact surface 214b of the second protruding portion 214 from an initial contact surface. In this embodiment, the first contact surfaces 212b, 214b have a substantially trapezoid shape. The first and second surfaces 212a, 214a, are preferably flat surfaces that are co planar or intersect to form a V shape.

Figure 8:
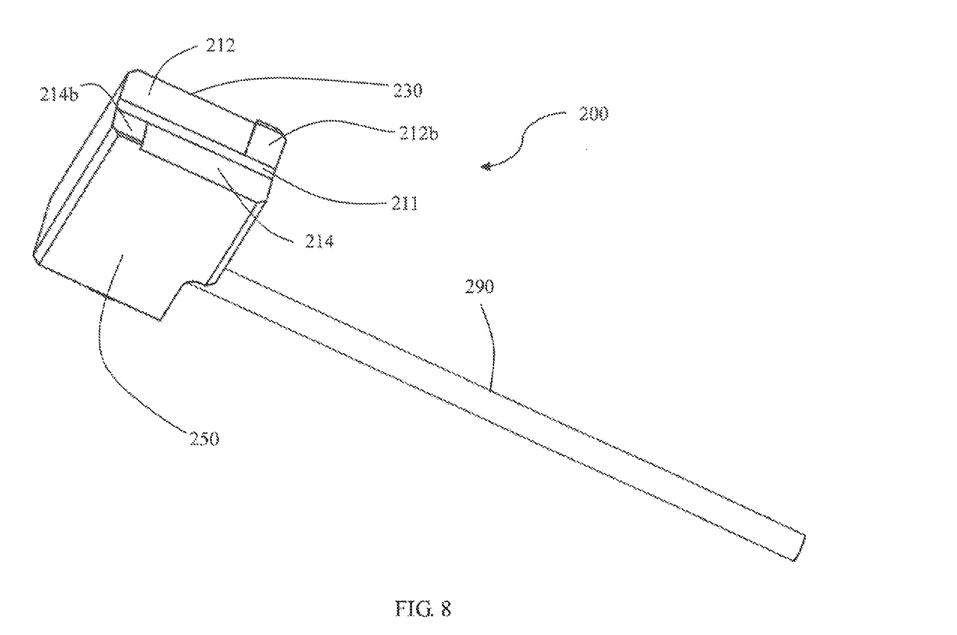
FIG. 8 illustrates a brush according to a third embodiment of the invention.
Figure 9:
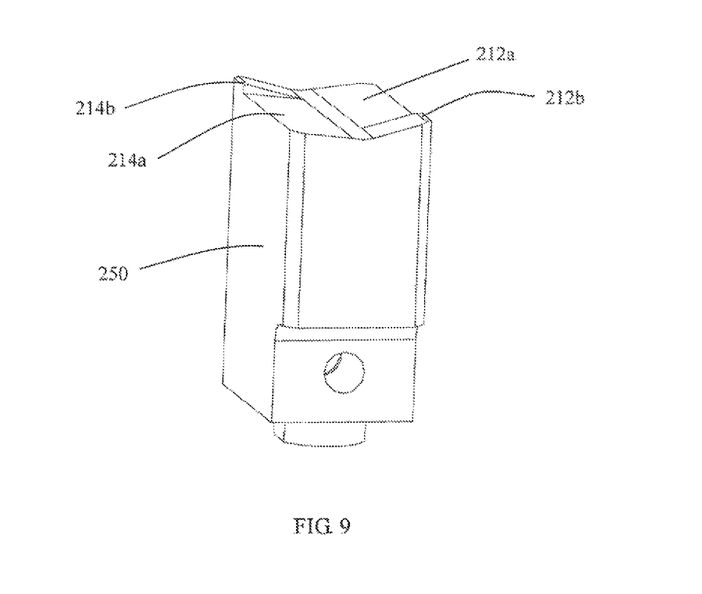
FIG. 9 illustrates the brush of FIG. 8, viewed from another aspect.

Referring to FIG. 8 and FIG. 9, the first protruding portion 212 and the second protruding portion 214 of the brush 200 provided by a third embodiment of the invention are also positioned on opposite sides of the center line of the brush, and cooperatively form a V shaped configuration. The difference between the second embodiment and the third embodiment is that the contact surface 212b of the first protruding portion 212 and the contact surface 214b of the second protruding portion 214 are rectangular.

Figure 10:
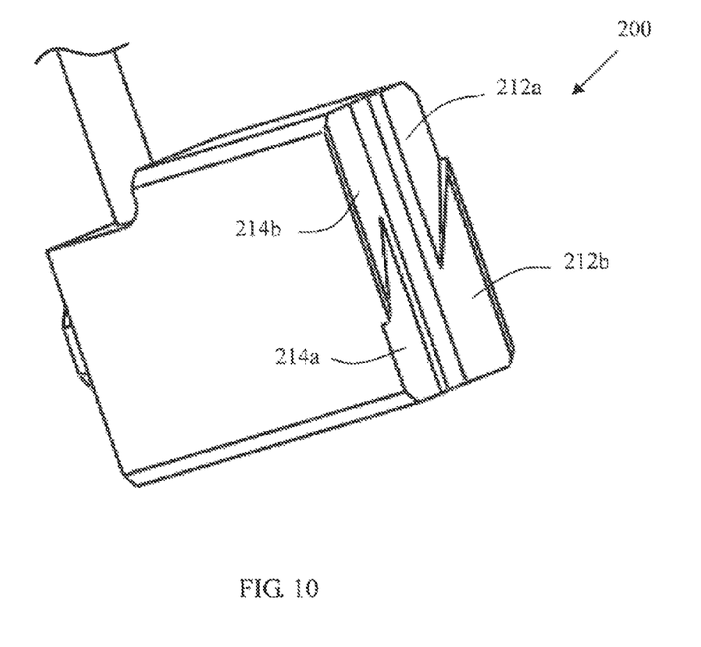
FIG. 10 illustrates a brush according to a fourth embodiment of the invention.
Figure 11:
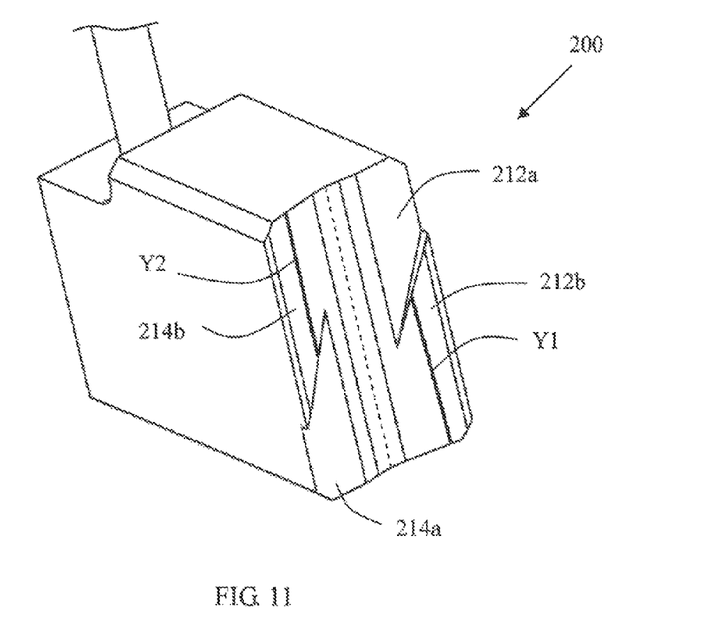
FIG. 11 shows the brush of FIG. 10, viewed from another aspect.

Referring to FIG. 10 and FIG. 11, the first protruding portion 212 and the second protruding portion 214 of the brush 200 provided by a fourth embodiment of the invention are also positioned on opposite sides of the center line of the brush, and cooperatively form a V shaped configuration. The brush of the fourth embodiment differs from the brush of the second embodiment in that, the first contact surface and the second contact surface have longer length in the axial direction of the motor. During operation of the motor, the brush contacts the commutator at two contact lines respectively on the first contact surface and the second contact surface. The contact lines are illustrated by Y1 and Y2 shown in FIG. 11. Preferably, the contact lines Y1, Y2 of the first and second contact surfaces have equal length. A ratio of the length of the contact line Y1 or Y2 to the axial height of the brush is between 20% and 90%, preferably between 40% and 80%. In such a manner, the brush contacts the commutator more stably when the commutator rotates, thus the noise of the motor is further suppressed. In this embodiment, the contact lines Y1 and Y2 have a length which is substantially half of the axial height of the brush.

In the above embodiments, the first surface of the first protruding portion and the second surface of the second protruding portion are both inclined surfaces. However, the first surface and the second surface can also be planar surfaces or arc surfaces.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. A brush for an electric motor, comprising:
   a brush body comprising: a front end surface configured to make sliding electrical contact with a commutator of the motor, the front end surface comprising a first contact surface and a second contact surface, the first contact surface and the second contact surface contacting the commutator earlier than other regions of the front end surface, and being respectively positioned at diametrically opposed corner portions of the front end surface; and
   a first side surface and a second side surface connected to the front end surface, the first side surface and the second side surface being positioned on opposite sides of the brush body in a rotational direction of the commutator.

2. The brush of claim 1, wherein the front end surface comprises a first protruding portion and a second protruding portion, the first contact surface is positioned on the first protruding portion, the second contact surface is positioned on the second protruding portion, and the first protruding portion and the second protruding portion cooperatively form a V shaped configuration.

3. The brush of claim 2, wherein the brush body is prismatic having a longitudinal axis parallel to the first and second side surfaces, and an inclination angle of the first protruding portion relative to a cross section which is perpendicular to the longitudinal axis of the brush body, is greater than an inclination angle of the first contact surface relative to the cross section.

4. The brush of claim 3, wherein a protruding height of the first protruding portion and a protruding height of the second protruding portion gradually increase in a direction away from the first diagonal line, and gradients of the protruding height of the first protruding portion and the second protruding portion relative to the first diagonal line are substantially the same.

5. The brush of claim 2, wherein the first protruding portion and the second protruding portion are respectively positioned on opposite sides of a first diagonal line of the front end surface, and the first contact surface and the second contact surface are positioned at opposite ends of a second diagonal line of the front end surface.

6. The brush of claim 5, wherein a protruding height of the first protruding portion and a protruding height of the second protruding portion gradually increase in a direction away from the first diagonal line, and gradients of the protruding height of the first protruding portion and the second protruding portion relative to the first diagonal line are substantially the same.

7. The brush of claim 2, wherein the first protruding portion and the second protruding portion are positioned on opposite sides of a center line of the front end surface, the center line is disposed mid-way between and parallel to the first and second side surfaces.

8. The brush of claim 7, wherein the brush body is prismatic having a longitudinal axis parallel to the first and second side surfaces, and an inclination angle of the first protruding portion relative to a cross section which is perpendicular to the longitudinal axis of the brush body, is greater than an inclination angle of the first contact surface relative to the cross section.

9. The brush of claim 7, wherein a protruding height of the first protruding portion and a protruding height of the second protruding portion gradually increase along a direction away from the first diagonal line, and gradients of the protruding height of the first protruding portion and the second protruding portion relative to the first diagonal line are substantially the same.

10. The brush of claim 8, wherein a protruding height of the first protruding portion and a protruding height of the second protruding portion gradually increase in a direction away from the center line, and gradients of the protruding height of the first protruding portion and the second protruding portion relative to the center line are substantially the same.

11. The brush of claim 7, wherein the first contact surface and the second contact surface each contact the commutator along a contact line, a ratio of a length of the contact line to an axial height of the brush is between 20% and 90%.

12. The brush of claim 7, wherein the first contact surface and the second contact surface each contact the commutator along a contact line, a ratio of a length of the contact line to an axial height of the brush is between 40% and 80%.

13. The brush of claim 7, wherein the first contact surface and the second contact surface each contact the commutator along a contact line, the contact line has a length which is substantially half of an axial height of the brush.

14. The brush of claim 1, wherein the first contact surface and the second contact surface have a prismatic shape, a frustum of pyramid shape or a wedge shape.

15. The brush of claim 1, wherein the first contact surface and the second contact surface are symmetrical about a central point of the front end surface.

16. The brush of claim 1, wherein cross sections of the first contact surface and the second contact surface have areas gradually decreasing in the protruding directions of the first contact surface and the second contact surface, respectively.

17. The brush of claim 1, wherein the front end surface forms a first flat surface at a region adjacent to the first contact surface and the first side surface, the front end surface forms a second flat surface at a region adjacent to the second contact surface and the second side surface, the first flat surface intersects or is coplanar with the second flat surface.

18. A motor comprising:
a stator, including brush gear having brushes; and
a rotor rotatably assembled to the stator, the rotor comprising a shaft, a commutator and a rotor core fixed to the shaft, and rotor windings wound around the rotor core and electrically connected to segments of the commutator;
wherein each brush has a brush body comprising:
a front end surface configured to make sliding electrical contact with the commutator, the front end surface comprising a first contact surface and a second contact surface, the first contact surface and the second contact surface contacting the commutator earlier than other regions of the front end surface, and being respectively positioned on opposite corners of the front end surface; and
a first side surface and a second side surface connected to the front end surface, the first side surface and the second side surface being positioned on opposite sides of the brush body in a rotational direction of the commutator.

19. A gear motor assembly, comprising:
a motor comprising a stator including brush gear having brushes, and a rotor rotatably assembled to the stator, the rotor comprising a shaft, a commutator and a rotor core fixed to the shaft, and rotor windings wound around the rotor core and electrically connected to segments of the commutator, and a worm provided on the shaft;
a gearbox assembled to the motor; and
a gear train accommodated by the gearbox,
wherein each brush has a brush body comprising:
a front end surface configured to make sliding electrical contact with the commutator, the front end surface comprising a first contact surface and a second contact surface, the first contact surface and the second contact surface contacting the commutator earlier than the other regions of the front end surface, and being respectively positioned at opposite corners of the front end surface; and
a first side surface and a second side surface connected to the front end surface, the first side surface and the second side surface being positioned on opposite sides of the brush body in a rotational direction of the commutator.

20. The gear motor assembly of claim 19, wherein the gear train includes a worm provided on the shaft of the motor and a worm wheel disposed in the gearbox and engaged with the worm.

* * * * *